UNITED STATES PATENT OFFICE.

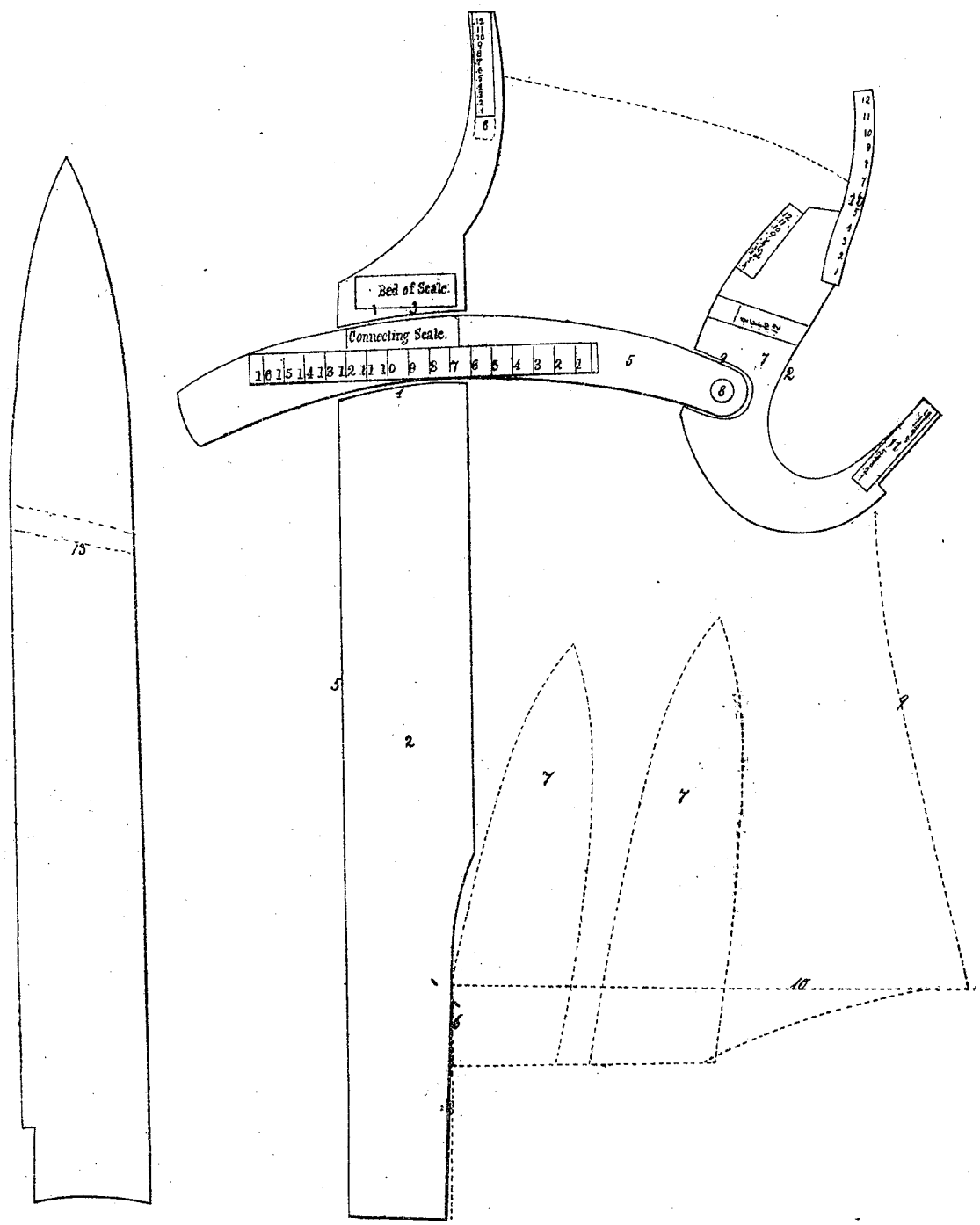

JAMES M. WESTON, OF CHESTERFIELD, NEW YORK.

MACHINE FOR DRAFTING GARMENTS.

Specification of Letters Patent No. 19,271, dated February 2, 1858.

*To all whom it may concern:*

Be it known that I, JAMES M. WESTON, of Chesterfield, in the county of Essex and State of New York, have invented a new and useful Machine for Cutting Coats and Dresses, which I call "The Connecting-Scale and Rotary Arm-Size;" and I do hereby declare that the following is a full, clear, and exact description of the construction and operation of the same, reference being had to the accompanying drawings, making part of this specification.

Figure 1 is a perspective view. Fig. 2 is the bed of scale, made of wood 16 inches long from point to point by 2¼ inches wide and ⅛ inch thick. Fig. 3 the flange on bed of scale to receive the connecting scale. Fig. 4 a button with which to fasten and hold in place the connecting scale. Fig. 5 the connecting scale, sliding through flange at Fig. 3, of wood ⅛ inch thick with which to increase or lessen size according to size of bust. Fig. 6 is the neck scale of brass attached to bed of scale about four inches long upon which is marked the figures measuring the size of neck. Fig. 7 is the rotary arm size of brass attached to the connecting scale, by a rivet (Fig. 8) and rotates to and from neck scale according to the governing figures placed on the connecting scale, neck scale and arm size. Fig. 9 is an index of brass pointed at one end and attached by the other to the rivet, (Fig. 8) placed at any figure on rotary arm size denoted by the connecting scale and used to govern the movement of the rotary arm size. Fig. 10 is the upper scale on arm size to increase its length according to governing figure. Fig. 11 under part of arm size to increase or diminish arm size. Fig. 12 is a scale for measuring back arm size. Fig. 13 is the rule for making all lines and curves not made with the scale together with the bias points and all measures in cutting dresses and coats except measures by the tape.

The manner of operation and working of the machine and directions for its use are fully explained in the printed statements attached to the drawing.

The following is an example of the manner of using the machine in cutting dresses and coats. First take the tape and measure size of bust above the fullest part. Say the measure is 29 inches, then the governing figure is 3. Then let the connecting scale be so placed in the flange, that the governing figure 3 will be parallel with the inside of the bed of scale, then turn the rotary arm size so that the index (Fig. 9) shall point to figure 4 on the index, then place the rule (13) the point at figure 3 on arm size with edge of rule placed at figure 3 on neck scale and form line 3. This is for top of shoulder, then make line 2 inside of arm size, then form the lines 4 and 5 down outside of bed of scale, form line 6 inside of bed of scale. The scale is here taken from the cloth—then measure with rule from the under part of arm size to line 10 which indicates the lower part of the waist. Line 10 is one half the size of waist and figure 9 to line 9 is the under arm seam and should be a straight line from figure 3 on the lower arm scale to the end of line 10. The bias points 7—7 are formed by placing rule on to the cloth 1st line 11 true with line 10 ½ inch apart on line 10 mark around the point of rule as 7 and 7. The same rule as in this example applies to any other governing figure through all the scales.

For cutting back of garment I herewith exhibit a chart in pencil which is drawing No. 2. First the cloth is to be doubled. A line 3 inches long ruled ¼ inch from top of cloth as indicated by line '2, the scale is placed upon the cloth true with the double edge with the required figure on neck scale on line 2. Measure the width of the neck at the top with the notch at curved end of the rule, then measure the required length of the under arm seam figure 4, from the lower part of arm size carry it down to line 5 which is the bottom of the waist, then measure the width of back at the bottom which is 4 inches, rule line 5 at bottom of the waist, rule line 4 with the point of rule placed at the bottom of arm size. Draw line 6 forming the top of the shoulder from the top of the arm size to a dot in line 2, then draw the lines indicating the depth of seams 7—7 and the work is done. I do not intend the connecting scale and rotary arm size particularly for the use of tailors but from its very simple easy and cheap construction and the connections and accuracy with which the scales are made to apply, that every lady may be able by the use of the machine to cut garments with accuracy and with little or no expense compared with the ordinary mode of cutting garments. In fact I believe it to be a machine which should be used in every family.

Having fully described my machine what I claim as my invention and desire to secure by Letters Patent is—

The adjustable curved plate or arm size 7, and index pointer 9 in combination with bed rule 2 and connecting rule 5, provided with their several scales, when constructed and operating in the manner described for the purpose specified.

Dated this 8th day of January, A. D. 1858.

JAS. M. WESTON.

Witnesses:
 H. M. CHASE,
 SAML. AMES.